US009720131B2

(12) United States Patent
Zhuo et al.

(10) Patent No.: US 9,720,131 B2
(45) Date of Patent: Aug. 1, 2017

(54) SYSTEM AND METHOD OF BUILDING COMPLEX EARTH MODELS

(71) Applicants: Lei Zhuo, Houston, TX (US); Joseph Paul Stefani, San Francisco, CA (US)

(72) Inventors: Lei Zhuo, Houston, TX (US); Joseph Paul Stefani, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 601 days.

(21) Appl. No.: 14/296,539

(22) Filed: Jun. 5, 2014

(65) Prior Publication Data

US 2015/0355373 A1 Dec. 10, 2015

(51) Int. Cl.
  *G06F 17/50* (2006.01)
  *G01V 99/00* (2009.01)
  *G06F 17/10* (2006.01)
  *G06G 7/48* (2006.01)

(52) U.S. Cl.
  CPC ............ *G01V 99/005* (2013.01); *G06F 17/10* (2013.01); *G01V 2210/64* (2013.01); *G01V 2210/66* (2013.01); *G06G 7/48* (2013.01)

(58) Field of Classification Search
  USPC ........................................................ 703/2, 1
  See application file for complete search history.

(56) References Cited

U.S. PATENT DOCUMENTS

| 6,138,076 A | 10/2000 | Graf et al. |
| 7,953,587 B2 | 5/2011 | Bratton et al. |
| 8,577,660 B2 | 11/2013 | Wendt et al. |
| 2013/0046524 A1 | 2/2013 | Gathogo et al. |
| 2013/0218539 A1 | 8/2013 | Souche |
| 2013/0231903 A1 | 9/2013 | Li et al. |
| 2013/0289962 A1 | 10/2013 | Wendt et al. |

FOREIGN PATENT DOCUMENTS

WO  WO2012/108917  8/2012

OTHER PUBLICATIONS

PCT International Preliminary Report on Patentability, International App. No. PCT/US2015/014732, dated Dec. 15, 2016.
Chira-Oliva et al., "3-D modeling of complex geological structures", 11th International Congress of the Brazilian Geophysical Society, 2009, pp. 1427-1432.
PCT Notification of Transmittal of the International Search Report and the Written Opinion of the International Searching Authority, or the Declaration, Jun. 8, 2015, 10 pages.

*Primary Examiner* — Thai Phan
(74) *Attorney, Agent, or Firm* — Yalei Sun; Marie L. Clapp

(57) ABSTRACT

A method is described that includes accessing, for a geological medium: a horizon model including a plurality of horizons in the geological medium; a fault model including a plurality of faults in the geological medium; and a rock property model including one or more physical rock properties at a plurality of spatial locations on a first grid corresponding to the geological medium. The method further includes determining intersections between the horizons and the faults by correlating the horizon model with the fault model and calculating a faulted structural model for the geological medium in accordance with the intersections between the horizons and the faults. The method further includes generating an earth model for seismic forward modeling by assigning one or more physical rock properties to the faulted structural model in accordance with the rock property model.

21 Claims, 10 Drawing Sheets

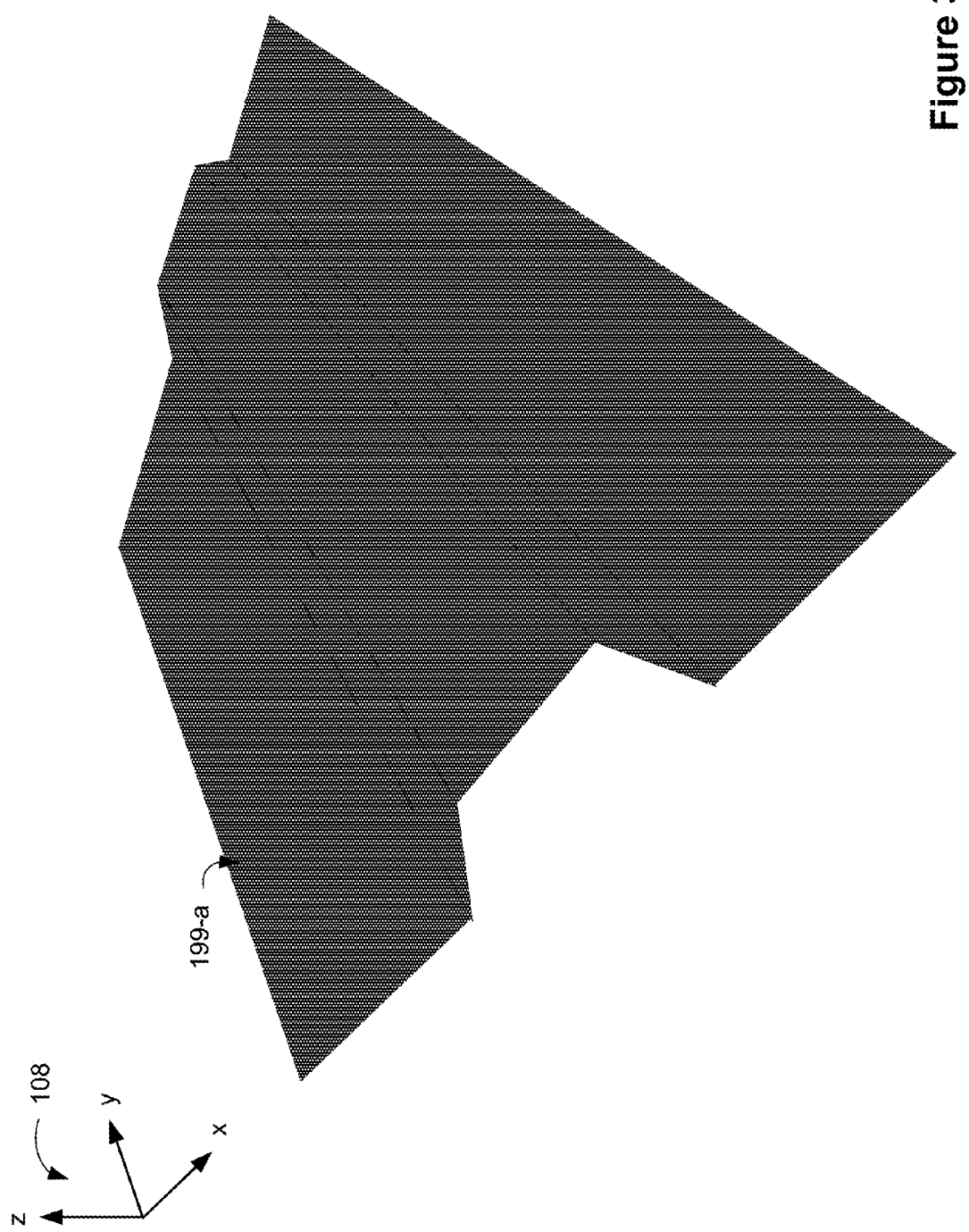

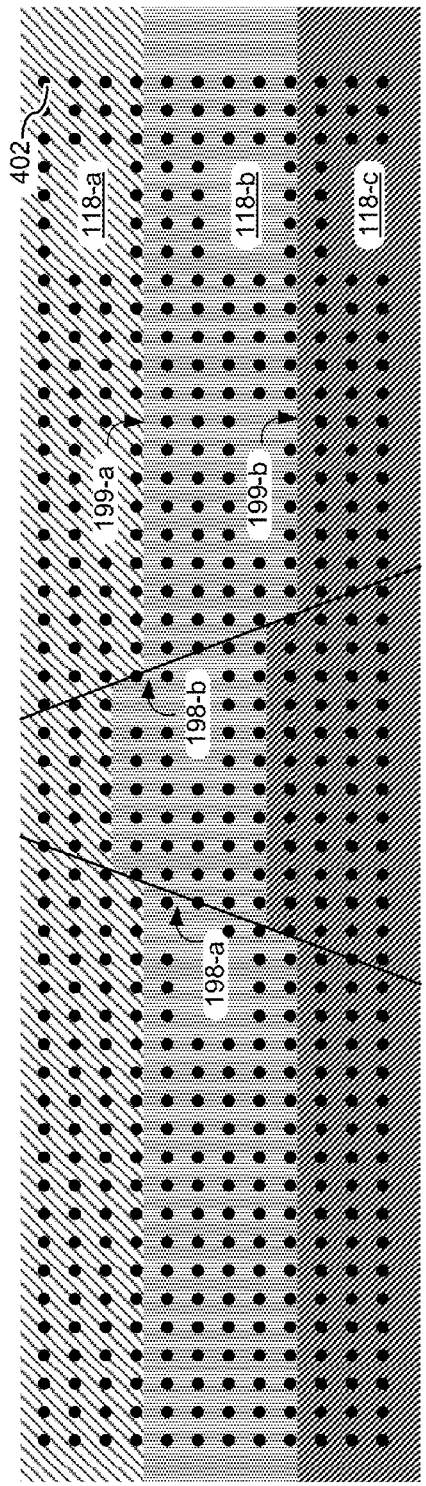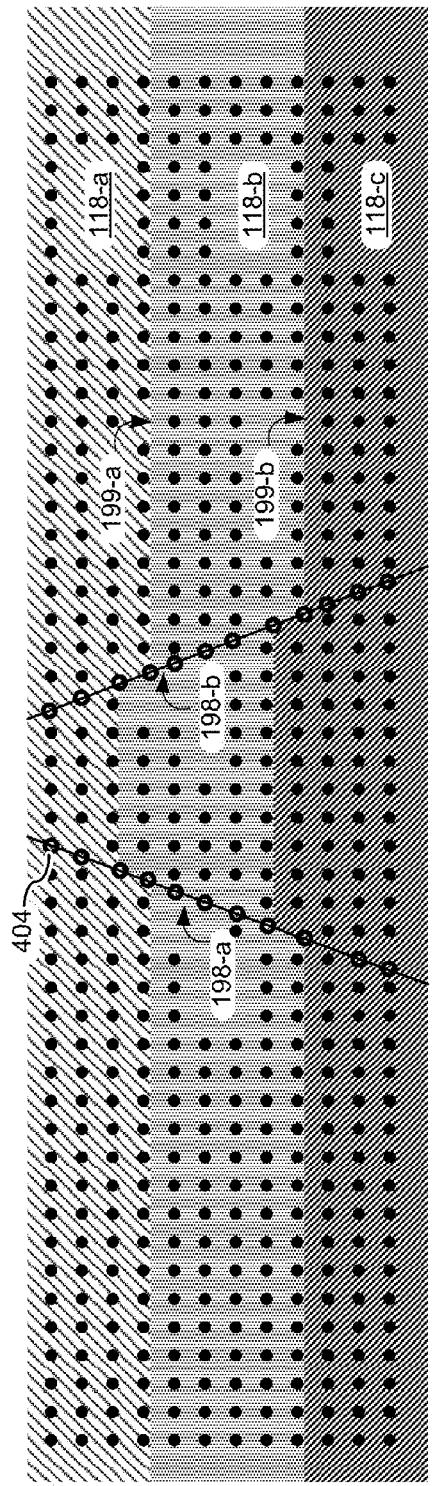
Figure 4A                              Figure 4B

SYSTEM AND METHOD OF BUILDING COMPLEX EARTH MODELS

TECHNICAL FIELD

The disclosed embodiments relate generally to techniques for using geophysical data (e.g., seismic data and/or well-log data) to build complex earth models that account for horizons, faults, and rock properties.

BACKGROUND

Seismic exploration involves surveying subterranean geological media for hydrocarbon deposits. Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

A survey typically involves deploying seismic source(s) and seismic sensor(s) at predetermined locations. The sources generate seismic waves, which propagate into the geological medium creating pressure changes and vibrations. Variations in physical properties of the geological medium change properties of the seismic waves, such as their direction of propagation and other properties. Parts of the seismic waves reach the seismic sensors. Some seismic sensors are sensitive to pressure changes (hydrophones), others to particle motion (e.g., geophones), and industrial surveys may deploy only one type of sensor or both. In response to the detected seismic waves, the sensors generate corresponding electrical signals and record them in storage media as seismic data.

Well-log data can also be used to better understand a geological medium. Well-log data is obtained by placing a sensor (e.g., an electrical sensor, porosity sensor, gamma ray sensor, nuclear magnetic resonance (NMR) sensor, and/or others) in a well that has been, or is being drilled, and measuring various properties along the path of the well using the sensor.

One goal of seismic exploration is to create an accurate image of the underground geological structure using the seismic data collected from the region and an earth model that represents a geomechanical state of the same region. But current earth models lack the level of detail, resolution, and complexity needed for modern hydrocarbon exploration.

SUMMARY

Accordingly, there is a need for earth models that include information about more complex structures of a geological medium. Such earth models would give a more detailed picture of the geological medium, help produce more accurate seismic images, and offer better insights for exploration and hydrocarbon recovery.

In accordance with some embodiments, a method is performed at a computer system with one or more processors and memory. The method includes accessing, for a geological medium: a horizon model including a plurality of horizons in the geological medium; a fault model including a plurality of faults in the geological medium; and a rock property model including one or more physical rock properties at a plurality of spatial locations on a first grid corresponding to the geological medium. The method further includes determining one or more intersections between respective horizons of the horizon model and respective faults of the fault model by correlating the horizon model with the fault model. The method further includes calculating a faulted structural model for the geological medium in accordance with the one or more determined intersections between respective horizons of the horizon model and respective faults of the fault model. The method still further includes generating an earth model for seismic forward modeling by assigning one or more physical rock properties to the faulted structural model in accordance with the rock property model.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIGS. 3A-3D illustrate a graphical example of a method of building complex earth models, in accordance with some embodiments.

FIGS. 4A-4B illustrate warping of a first grid or mesh onto a second grid or mesh, in accordance with some embodiments.

Like reference numerals refer to corresponding parts throughout the drawings.

DETAILED DESCRIPTION OF EMBODIMENTS

Figure 1:
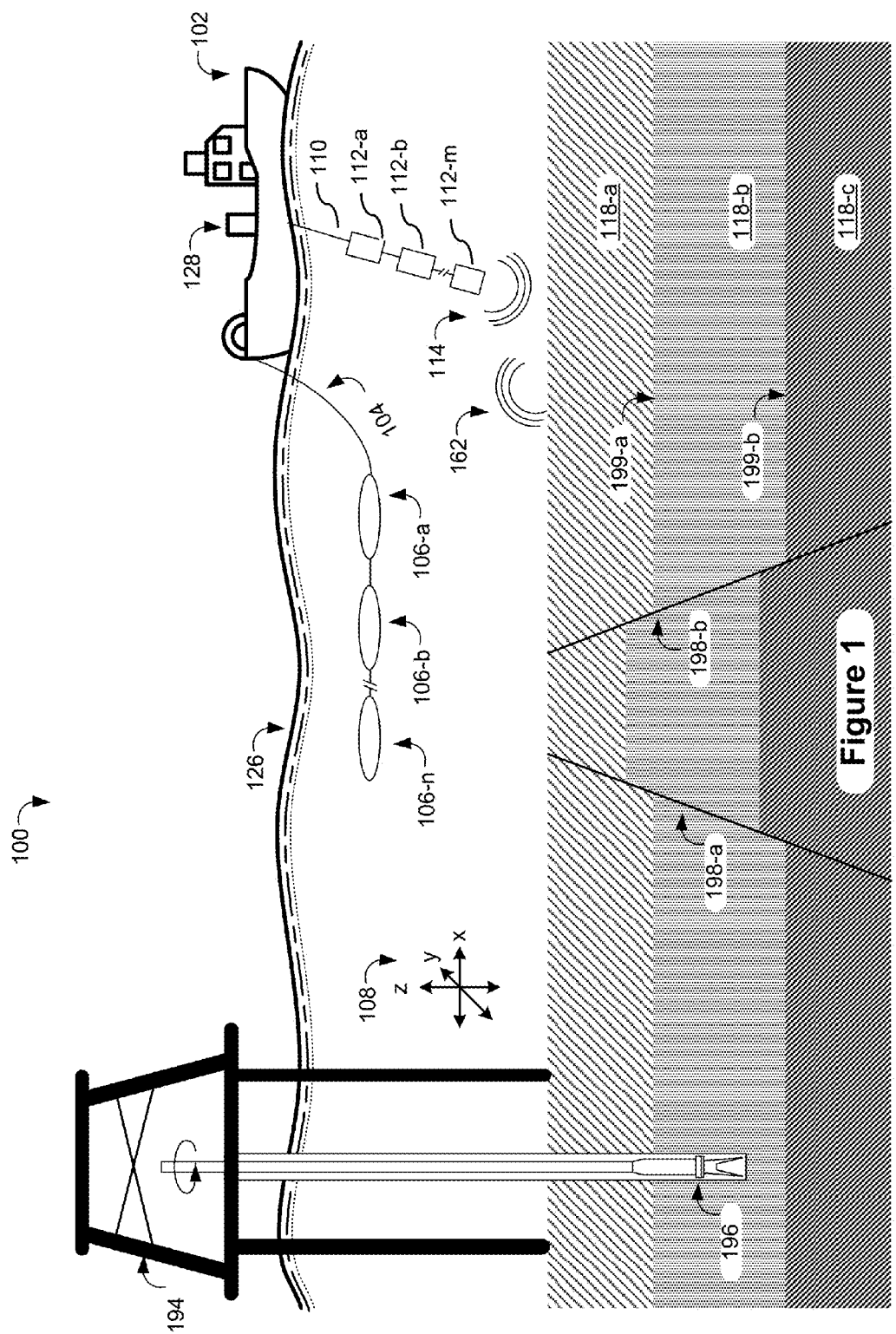
FIG. 1 is a schematic diagram of a marine geological exploration environment, in accordance with some embodiments.

Described below are methods, systems and computer readable storage media that provide a manner of building complex earth models. These earth models are used, in some circumstances, for seismic forward modeling or seismic imaging. An earth model is a model for a geological medium that specifies, at each point on a numerical grid within the geological medium (sometimes called a "mesh"), a value for each of one or more physical properties of the geological medium, including: density, porosity, various wave propagation velocities (e.g., s-wave and p-wave velocities), and/or other rock properties. Forward modeling is a process (e.g., a simulation) by which seismic wave (e.g., synthetic source data) is numerically propagated through a geological medium and captured by an array of receiver locations.

Forward modeling using an earth model is useful for a number of reasons. As one example, synthetic source data can be propagated via forward modeling to receiver locations to produce synthetic seismic data. The synthetic seismic data can be compared to measured seismic data as part of an iterative process used to further refine the earth model, thereby making the earth model more accurate. As another example, once a satisfactory earth model has been obtained, forward modeling can be used to increase the resolution of seismic sections (e.g., "images" of the geological medium) through a process known as reverse time migration (RTM).

Conventional earth models often have a challenge of accounting for faults in a geological medium. This means that horizons in conventional earth models are seamless. As used herein, the term "horizon" is used to mean a boundary between adjacent lithographic strata (or, alternatively, a respective surface of a particular lithographic stratus), and the term "fault" is used to mean a break in rock across which there is observable displacement. As such, a fault will also represent a break, or "seam," in any horizon transected (e.g., crossed) by the fault. One reason conventional earth models fail to account for faults is that, although seismic data is spatially extended, inversion of seismic data generally yields a "smooth" earth model in which faults appear the same as folds. (Inversion of seismic data is the process of generating an earth model from measured seismic data, e.g., as obtained in a marine geophysical exploration environment, as described with reference to FIG. 1.) Unlike a fault, a fold is a wave-like geological structure that forms when rocks deform by bending instead of breaking (see description of FIG. 2), and thus folded horizons are by definition seamless. Types of folds include anticlines (arch-like structures), synclines (U-like structures) or monoclines (step-like structures). Well-log data also generally does not help with generation of three-dimensional fault models because well-log data is localized to the well within which it was obtained.

Nevertheless, a fault model for a geological medium can be generated by interpreting geophysical data, particularly seismic data. In various circumstances, fault modeling includes having a geologist hand pick fault planes, or at least certain locations on the fault planes, from inverted seismic data. In some embodiments, a computer system generates (e.g., interpolates) the remainder of the fault model using the geologist's picks. Alternatively, fully computerized methods of fault plane picking may be used, for example, by rendering an additional analysis upon the inverted seismic data. Generally speaking, the details of fault modeling and horizon modeling (e.g., the process of creating a model of the rock horizons within the geological medium) fall outside of the focus of the present disclosure, but are described in greater detail, for example, in Sheriff, Robert E., Geldart, Lloyd P., *Exploration Seismology*, Second Edition, Cambridge: Cambridge University Press, 1995, which is incorporated herein by reference in its entirety.

Faults are important for a number of reasons. Faults may constitute a hydrocarbon trapping mechanism, meaning that certain fault structures provide candidates for drilling locations. As another example of their importance, some fault structures are responsible for sharp transitions between so-called "high-velocity" rock and so called "low-velocity" rock. Such sharp transitions between two different rock types can be potential drilling hazards. Also, when an earth model is used for forward modeling, unwanted effects in the forward modeled data (e.g., effects that are not physically accurate) arise from horizons that are erroneously represented as seamless. In some circumstances, for example, these effects are due to refraction of propagated seismic data off of an erroneously seamless horizon. Such effects hinder the resolution of seismic sections when used for migration (e.g., RTM, as discussed above), and hamper iterative algorithms used to further refine earth models (also discussed above).

The complex earth models described herein combine a horizon model, a fault model, and a rock property model for a geological medium by determining one or more intersections between respective horizons of the horizon model and respective faults of the fault model. These models can be 2D or 3D models. In some embodiments, the determination includes correlating the horizon model with the fault model to produce a faulted structural model and then generating an earth model for seismic forward modeling by assigning one or more physical rock properties to the faulted structural model in accordance with the rock property model. The rock property model includes one or more physical rock properties (e.g., rock density, s-wave velocity, p-wave velocity, or porosity) at a plurality of spatial locations on a grid (sometimes called a "mesh") corresponding to the geological medium. In accordance with a wide variety of embodiments, the physical rock properties for the spatial locations on the grid are determined in any number of ways, including, for example, by inversion of seismic data (e.g., inverting seismic data to yield p-wave velocities), by using physical principles in combination with inverted seismic data (e.g., using Gardner's relation to convert between p-wave velocity and rock density), by using well-log data, and/or a combination thereof. In some embodiments, the earth model is used for forward modeling (e.g., using RTM to produce a high resolution seismic section). In some embodiments, the earth model is combined with a reservoir model so that, for example, an overburden pressure on a hydrocarbon deposit can be calculated.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

FIG. 1 is a schematic diagram of a marine geophysical exploration environment 100, in accordance with some embodiments. In marine geophysical exploration environment 100, a survey vessel 102 tows one or more seismic streamers (one exemplary streamer 104 being depicted in FIG. 1) behind the vessel 102. The seismic streamers 104 may be several thousand meters long and may contain various support cables (not shown), as well as wiring and/or circuitry (not shown) that may be used to support communication along the streamers 104. In general, a streamer 104 includes a primary cable onto which seismic sensors 106 are mounted (e.g., seismic sensor 106-*a*, 106-*b*, 106-*c* through seismic sensor 106-*n*) that record seismic signals. Collectively, the recorded seismic signals constitute seismic data.

In some embodiments, the seismic sensors 106 are pressure sensors or are multi-component seismic sensors. For the case of multi-component seismic sensors, each sensor is capable of detecting a pressure value and at least one component of a particle motion that is associated with acoustic signals that are proximate to the multi-component seismic sensor. Examples of particle motions include one or more components of a particle displacement (e.g., one or more of an in-line (x), a cross-line (y) and/or a vertical (z) component as shown in axes 108, for example), one or more components of particle velocity, and one or more components of particle acceleration.

In some embodiments, the multi-component seismic sensor may include one or more hydrophones, geophones, particle displacement sensors, particle velocity sensors, accelerometers, pressure gradient sensors, or a combination thereof.

For example, in some embodiments, a particular multi-component seismic sensor includes a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices. A particular multi-component seismic sensor may also include one or more pressure gradient sensors, which constitute another type of particle motion sensor. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the cross-line direction, and another one of the pressure gradient sensors may acquire, at a particular point, seismic data indicative of the pressure data with respect to the in-line direction.

Marine geophysical exploration environment 100 includes one or more seismic source arrays 110. A source array 110, in turn, includes one or more strings of seismic sources such as air guns (e.g., seismic source 112-*a*, 112-*b*, 112-*c* through seismic source 112-*m*). In some embodiments, the seismic sources 112 may be coupled to, or towed by, the survey vessel 102. Alternatively, the seismic sources 112 may operate independently of the survey vessel 102, in that the source elements 112 may be coupled to, for example, other vessels or buoys.

As the seismic streamers 104 are towed behind the survey vessel 102, acoustic signals 114 (sometimes referred to as "shots") are produced by the seismic sources 112 and are directed down through a water column 116 into lithographic strata 118 (e.g., lithographic strata 118-*a*, 118-*b*, and 118-*c* each represent a respective layer, or stratus, of the geological medium) beneath a water bottom surface 120. Reflected acoustic signals 122 are reflected from the various subterranean geological features, such as horizons 199 (e.g., horizon 199-*a* represents an interface between lithographic stratus 118-*a* and lithographic stratus 118-*b*).

The incident acoustic signals 114 produce corresponding reflected acoustic signals, or pressure waves, which are sensed by the seismic sensors 106. It is noted that the pressure waves that are received and sensed by the seismic sensors 106 include "up-going" pressure waves, as well as "down-going" pressure waves that are produced by reflections of the pressure waves from an air-water boundary 126.

The seismic sensors 126 generate signals (digital signals, for example), called "traces," which indicate the acquired measurements of the pressure wavefield and particle motion (if the sensors are particle motion sensors), e.g., as a function of time. The traces are recorded and are, in some embodiments, at least partially processed by a signal processing unit 128 that is deployed on the survey vessel 102.

Well-log data is another source of data that is available, in some circumstances, to help understand a geological medium. In an example scenario, a borehole 196 is drilled from a derrick 194. A well-logging sensor obtains well-logging data along the path of borehole 196. There are many different types of well-logging sensors, each capable of measuring a different physical property of the geological medium along the path of borehole 196. These include:

Resistivity well-log sensors that characterize the rock or sediment around borehole 196 by measuring electrical resistivity along the path of borehole 196;

Acoustic impedance sensors that measure acoustic impedance to create an image along the path of borehole 196;

Porosity sensors that use acoustic or nuclear technology (e.g., neutron or gamma ray sensors) to measure the fraction or percentage pore volume in the rock along the path of borehole 196;

Density sensors that infer rock density along the path of borehole 196 by measuring resultant gamma rays after bombarding the rock with a radioactive source; and Nuclear magnetic resonance (NMR) sensors that are used to infer, for example, porosity and permeability values along the path of borehole 196.

Many other types of well-log sensors and/or combinations of sensor types can be employed. For example, some types of well-log data require core removal at select locations along the borehole 196 followed by analysis of said cores in a laboratory setting. Also, in accordance with various embodiments, well-logging can be performed in a logging while drilling (LWD) configuration or can be performed after drilling borehole 196. These embodiments are not described in detail for the sake of brevity, but are nonetheless intended to fall within the scope of the appended claims.

A goal of geophysical exploration is to build up an image of a survey area for purposes of identifying subterranean geological features (e.g., hydrocarbon deposits/reservoirs). To that end, an intermediate goal is to develop and accurate earth model. The earth models described herein are created by combining several sub-models, including a fault model, a horizon model, and a rock property model. In particular, when faults 198 transect horizons 199, seams are created in horizons 199. The earth models described herein capture (e.g., incorporate) such seams into an earth model and assign accordingly (e.g., map) the rock properties described by the rock property model. Subsequent analysis (e.g., forward modeling by way of reverse time migration) using the earth model may reveal probable locations of hydrocarbon deposits in the geological medium.

Figure 6:
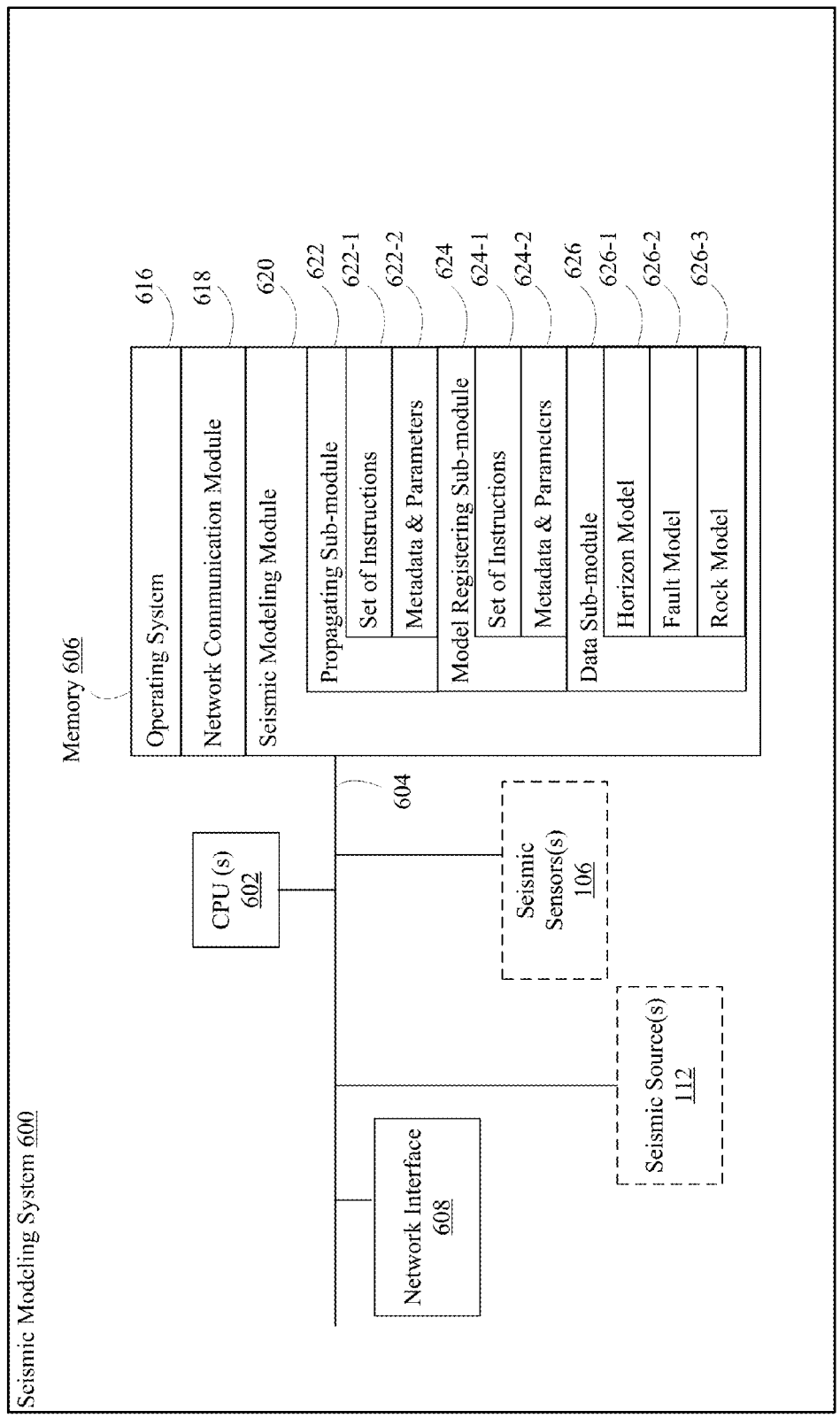
FIG. 6 is a block diagram illustrating a seismic modeling system, in accordance with some embodiments.

In some embodiments, some analysis of geophysical data (e.g., seismic or well-log data) may be performed on the seismic survey vessel 102, such as by the signal processing unit 128. In some embodiments, the geophysical data is processed, at least partially, by a seismic modeling system (such as an exemplary seismic modeling system 600 that is depicted in FIG. 6 and is further described below) that may be, for example, located on land or on the vessel 102. Thus, many variations are possible and are within the scope of the appended claims.

One of ordinary skill in the art will appreciate that the marine geophysical exploration environment 100 described above is merely an example of one of many different types of seismic data acquisition environments that may be used. For example, in some embodiments, a geophysical exploration environment may use stationary sensor cables that are disposed on the seabed. As another example, in some embodiments, a geophysical exploration environment may be a land-based environment in which sensor cables are buried in the earth. Thus, many variations are contemplated and are within the scope of the appended claims.

Figure 2:
FIG. 2 is an example image of an outcrop of a geological medium that is modeled to produce an earth model, in accordance with some embodiments.

FIG. 2 is an example image of an outcrop of a geological medium. While the methods, computer systems, and non-transitory computer readable storage media provided herein are described, for the sake of understanding, in the remainder of this document using simple examples, the purpose of FIG. 2 is to demonstrate that geological media are, in some circumstances, quite complex. To that end, the geological medium shown in FIG. 2 is an example of a geological medium that is modeled using the embodiments described herein (e.g., the embodiments described herein are used, in some circumstances, to generate an earth model for the geological medium exposed by the outcrop or an analogous geological medium). It should be understood, however, that geological media of interests (e.g., potential hydrocarbon bearing geological media) are often entirely subterranean, and therefore such outcroppings do not exist. Moreover, some embodiments of the present disclosure are used to generate three-dimensional models, in which case the complexity shown in FIG. 2 potentially extends throughout a three-dimensional volume.

To illustrate a specific example of the complexity in building earth models that account for faults, horizons, and rock properties, consider that the geological medium shown in FIG. 2 includes a plurality of faults 602 (e.g., fault 602-a, fault 602-b, and fault 602-c) and a plurality of horizons 604 (e.g., horizon 604-a and horizon 604-b). Horizons 604 are folded such that they are nearly parallel with faults 602. Many other faults and horizons are present in the geological medium, but are not labeled for the sake of clarity. Where a respective fault 602 transects a respective horizon 604, a seam 606 is created. Using conventional methods, it is difficult to distinguish between, for example, a steep fold in a horizon 604 and a seam 606 created by a steeply normal fault 602. But by combining, in accordance with some embodiments, a seamless horizon model with a separately generated fault model to produce a faulted structural model of the geological medium (e.g., a horizon model with seams created by faults), and then assigning rock properties to a numerical grid or mesh in accordance with the faulted structural model, the inaccuracies in conventional three-dimensional earth models for complex geological media are mitigated.

FIGS. 3A-3D illustrate a graphical example of a method of building complex earth models, in accordance with some embodiments. While, generally speaking, the methods described herein are used to build earth models in which a plurality of horizons is present, for illustrative purposes, only a single horizon is shown (e.g., horizon 199-a from the geological medium shown in FIG. 1). FIGS. 3A-3D also include the axes 108, previously shown in FIG. 1, which indicate the in-line (x), cross-line (y), and vertical (z) directions.

FIG. 3A illustrates a horizon model that includes a single horizon 199-a. Horizon 199-a is specified in three-dimensions (in general, the shape of a horizon will vary in all three directions, e.g., the lateral directions and vertical direction). In some embodiments, horizon 199-a is specified with respect to a first grid or mesh (e.g., the dots in the shading of horizon 199-a in FIG. 3A each represent a point on the grid that belongs to horizon 199-a). Horizon 199-a is initially seamless (e.g., simply-connected) meaning that there are no holes in it.

Figure 3B:
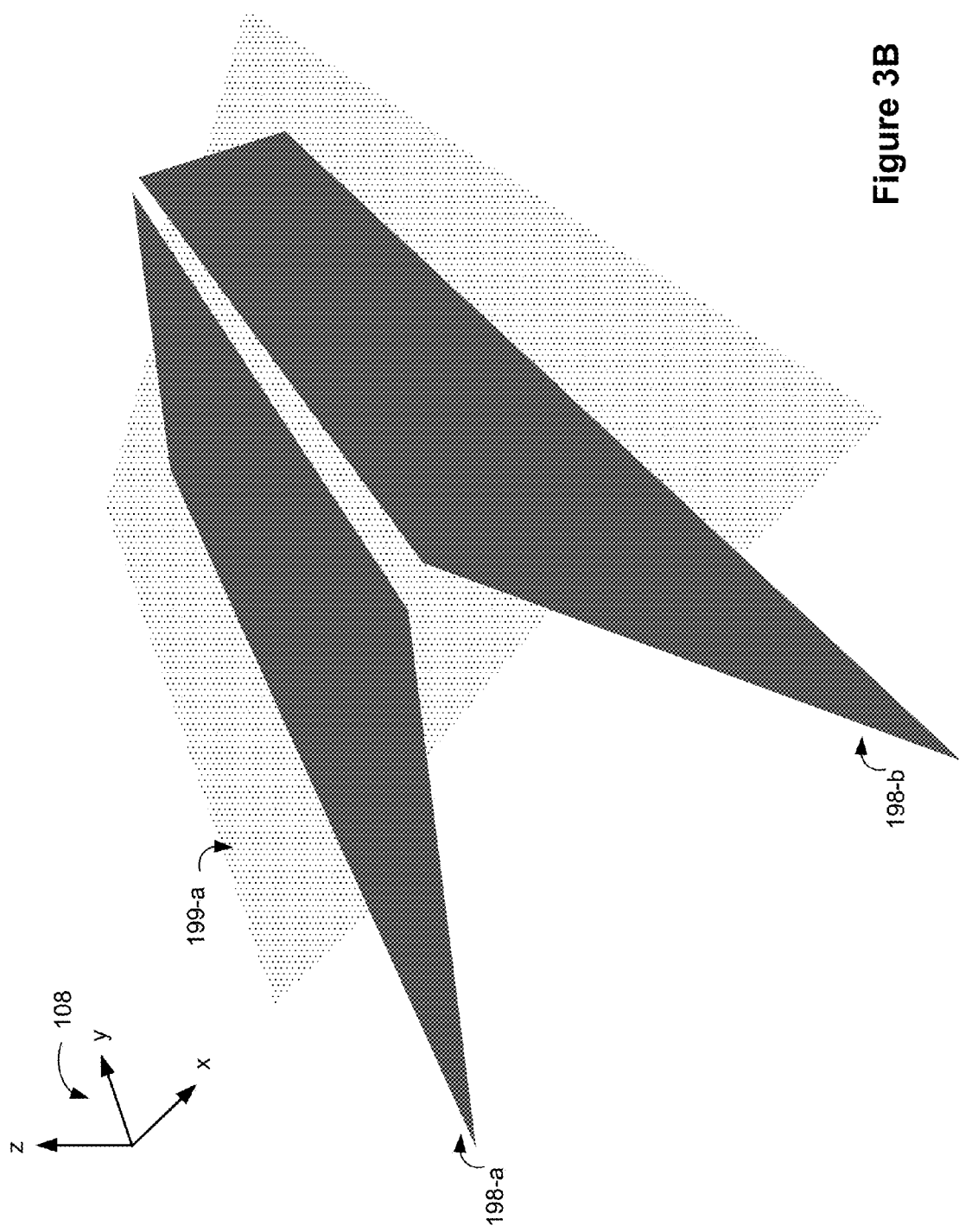

FIG. 3B illustrates a fault model that includes two faults: fault 198-a and fault 198-b. In some embodiments, faults 198 are also specified with respect to the first grid. For reference, horizon 199-a is still shown; however, for clarity, the shading has been modified to be lighter as compared to FIG. 3A. Faults 198 transect horizon 199-a, meaning that in the physical geological medium, the physical faults represented by faults 198 create seams (e.g., breaks or displacements) in the horizon represented by horizon 199-a. It is those seams that the present method captures when generating an earth model for the geological medium.

Figure 3C:

FIG. 3C illustrates an operation of determining where faults 198 (FIG. 3B) intersect horizon 199-a. For clarity, faults 198 have been omitted from FIG. 3C and horizon 199-a has been returned to its original shading presented in FIG. 3A. Regions 302 (e.g., region 302-a and region 302-b) are regions of intersection, meaning that a determination has been made that a respective fault 198 coincides with horizon 199-a at each point within regions 302. In some embodiments, any point on horizon 199-a's specification that is within a predefined distance tolerance of a fault 198 is determined to be within a region 302 of intersection. In some embodiments, a nominal region of intersection is generated by determining which points on horizon 199-a's specification lie within a predefined distance tolerance of a fault 198. In some embodiments, an additional smoothing operation is performed on the nominal regions of intersection to generate regions 302 and assure that the regions 302 are simply-connected (e.g., there are no holes in them).

Figure 3D:
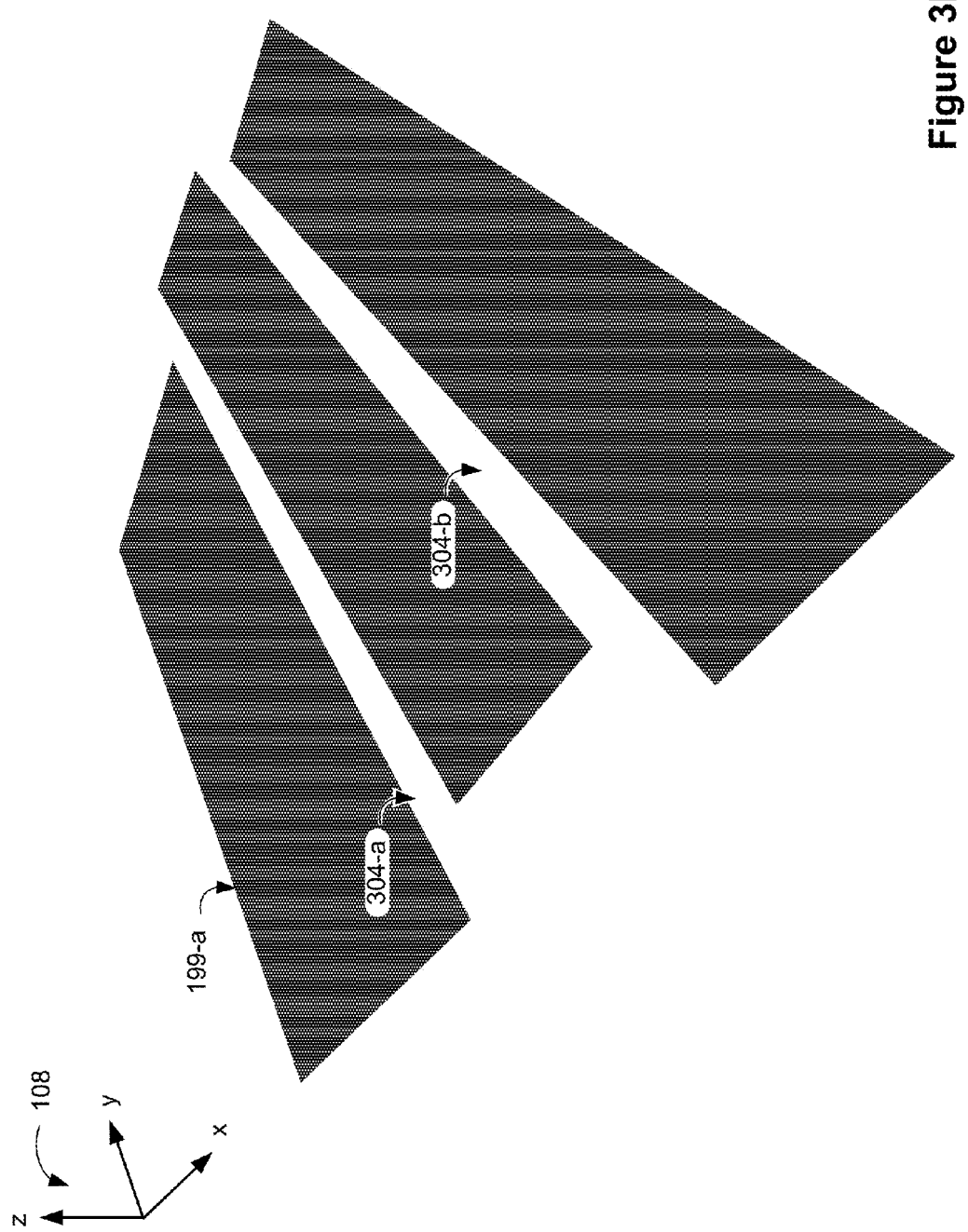

FIG. 3D illustrates a faulted structural model of the geological medium. In the faulted structural model, the specification of horizon 199-a has been modified to account for faults 198 (e.g., the regions 302 have been removed). In some embodiments, the specification of horizon 199-a has also been modified by mapping the specification from a first numerical grid or mesh to a second numerical grid or mesh that allows for more precise and accurate forward modeling of seismic signals given the faulted structure of the faulted structural model.

FIGS. 4A-4B illustrate warping of a first grid or mesh (e.g., a numerical grid or mesh) onto a second grid or mesh. In some embodiments, the first grid, shown in FIG. 4A, comprises a plurality of evenly spaced first spatial (e.g., grid) locations 402 (certain dots indicating spatial locations that interfere with reference numbers and/or arrows have been omitted for the sake of visual clarity). For example, in some embodiments, the first grid includes a plurality of first spatial locations in a three-dimensional volume evenly spaced by a predefined distance (e.g., 1 centimeter, 10 centimeters, 1 meter, or 10 meters) in the geological medium. In some embodiments, the first grid is a finite elements grid and the first spatial (e.g., grid) locations represent vertices of finite element volumes. Alternatively, the first grid is a finite differencing grid and the first spatial locations represent calculation locations.

As shown in FIG. 4B, in some embodiments, the first grid is remapped (along with fault, horizon, and rock property specifications) onto a second grid that includes one or more second spatial locations and/or lines aligned with a respective fault that intersects the respective horizon. For example, the second spatial locations 404 represented by the hollow circles have been remapped (e.g., warped, or moved) onto faults 198-a and 198-b.

Figure 5A:
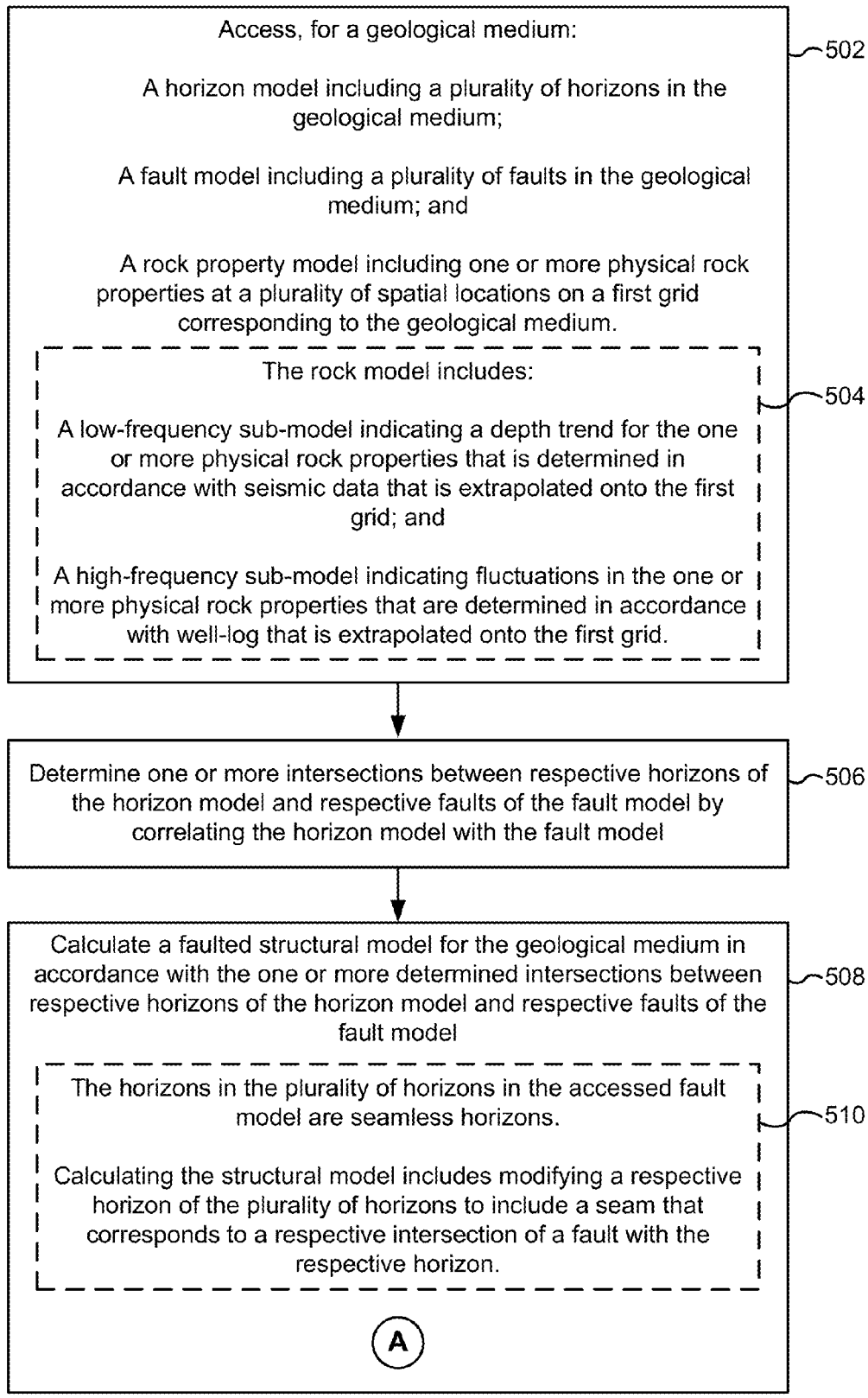
FIGS. 5A-5B are a schematic flowchart of a method of building complex earth models, in accordance with some embodiments.
Figure 5B:
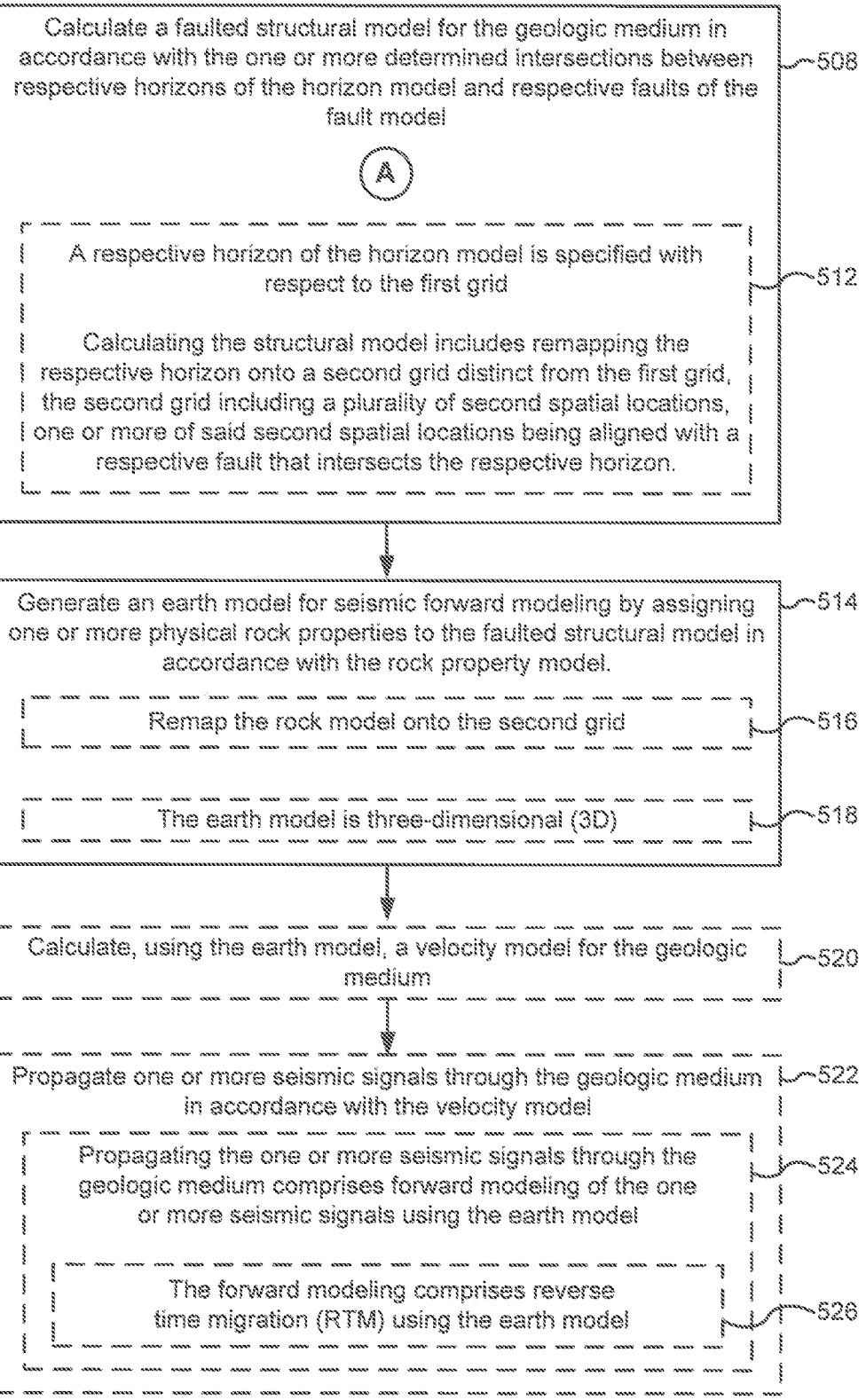

FIGS. 5A-5B are a schematic flowchart of a method 500 of building complex earth models, in accordance with some embodiments. Method 500 is, optionally, governed by instructions that are stored in computer memory or a non-transitory computer readable storage medium (e.g., memory 606 in FIG. 6) and are executed by one or more processors (e.g., processor(s) 602) of one or more computer systems, including, but not limited to, signal processing unit 128 (FIG. 1) and/or system 600 (FIG. 6). The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 500 is described as being performed by a computer system, although in some embodiments, various operations of method 500 are distributed across separate computer systems.

A computer accesses (502), for a geological medium: a horizon model including a plurality of horizons in the geological medium (an example horizon in a horizon model is shown in FIG. 3A); a fault model including a plurality of faults in the geological medium (two examples of faults in a fault model are shown in FIG. 3B); and a rock property model including one or more physical rock properties at a plurality of spatial locations on a first grid corresponding to the geological medium. In some embodiments, the computer system receives and stores the horizon model, the fault model, and the rock property model.

In some embodiments, the horizons in the horizon model represent boundaries between adjacent lithographic strata, or alternatively (in some cases equivalently), the horizons represent a respective surface (e.g., the top surface or the bottom surface) of a respective lithographic stratus. For example, as shown in FIG. 1, horizon 199-a can be described as a boundary between lithographic stratus 118-a and lithographic stratus 118-b. Alternatively, horizon 199-a can be described as a top surface of lithographic stratus 118-b or a bottom surface of lithographic stratus 118-a. Variously, the lithographic strata optionally include rock strata, sediment strata, and or fluid strata (e.g., representing ocean). The horizon model optionally includes one or more free horizons (e.g., representing seafloor, sea-level, and/or ground) that, in some circumstances, will transect one or more non-free horizons (e.g., when the lithography is tilted with respect to the seafloor). In some embodiments, each horizon in the plurality of horizons is specified in two-dimensions or three-dimensions with respect to the first grid or mesh (e.g., a finite element or finite difference grid or mesh). In some embodiments, the horizon model represents a present state or structure of the horizons (e.g., a state in present geological time, as compared with a state or structure of the horizons at a previous geological time when the lithographic strata were deposited). To that end, the horizons in the horizon model are, in some circumstances, folded and/or tilted. However, as noted below, in some embodiments the horizons in the horizon model are seamless, meaning that each horizon is represented by a continuous surface (e.g., each horizon is represented by a simply-connected surface). In some embodiments, prior to accessing the horizon model, the horizon model is generated by inversion of seismic data and/or geological interpretation of seismic data.

In some embodiments, the faults in the fault model represent breaks in lithographic strata with displacement of the lithographic strata on one side of each fault with respect to the other side. Faults can be categorized as being primarily normal (i.e., compressive or tensile), or strike-slip (e.g., shear); however, often faults include more than one type of character (e.g., a compressive component and a shear component). In some embodiments, each fault in the fault model is specified with respect to the first grid (e.g., the same grid with which the horizons in the horizon model are specified).

Faults are, in various embodiments, specified in two-dimensions (2D) or three-dimensions (3D), depending on the dimensionality of the first grid. In various embodiments, prior to accessing the fault model, the faults in the fault model are generated by interpreting seismic data, interpreting inverted seismic data, interpreting seismic sections, and/or using other methodologies and combinations of the aforementioned methodologies. In some embodiments, generating the faults in the fault model includes specifying the faults with respect to the first grid. The specification is achieved, in various embodiments, by having a geologist hand pick specific fault locations and having a computer interpolate between said fault locations (e.g., using the seismic data), or through fully-automated computer methods.

In some embodiments, the physical rock properties in the rock property model include, for each point on the first grid, a value for one or more of: a p-wave velocity $V_p$, an s-wave velocity $V_s$, the Thomsen parameters $\delta$ and $\epsilon$, density $\rho$, and/or an attenuation factor Q (e.g., when the rock property model includes an attenuation model). In some circumstances, the geological medium is anisotropic and the rock property model specifies, for each point on the first grid, two or more values for the p-wave velocity (e.g., $V_{px}$, $V_{py}$, and $V_{pz}$). In an analogous fashion, in some embodiments, two or more values are specified for other rock properties for each point on the first grid as well. In some embodiments, the values of the rock property model are determined by combining values obtained from low-frequency seismic data with high-frequency well-log data. For example, in some embodiments, the rock model includes (504): a low-frequency sub-model (e.g., sometimes called a DC model, where DC stands for "direct current" in an analogy to electrical signal processing) indicating a depth trend for the one or more physical rock properties that is determined in accordance with seismic data that is extrapolated onto the first grid, and a high-frequency sub-model indicating fluctuations in the one or more physical rock properties that are determined in accordance with well-log data that is extrapolated onto the first grid. For example, in some embodiments, porosity is measured at a plurality of depths along a borehole within the geological medium, yielding a depth trend. In some embodiments, the high-frequency sub-model is used to account for (e.g., calculate) lateral fluctuations (e.g., perturbations, also called "fine-structure," in the lateral directions) away from the depth trend. In some embodiments, the calculation is done using an optimization algorithm (routine) that attempts to minimize a residual data (e.g., residual travel-time data, or residual amplitude data) once the depth trend has been considered. In some embodiments, the depth trend describes a one-dimensional rock property trend.

In some embodiments, the complex earth model built (e.g., generated) by method 500 includes two volumes: a first volume that represents the geological medium and a second volume which represents a non-physical boundary region. The purpose of the non-physical boundary volume is to avoid spurious artifacts that arise when the earth model is used to simulate propagation of seismic waves in a finite volume (e.g., spurious artifacts arising from non-physical boundary conditions). To that end, in some embodiments, the second volume includes an attenuation (Q) profile and velocity profiles that are design (e.g., constructed, contrived) to avoid reflecting and/or refracting simulated seismic energy back into the first volume when said seismic energy reaches the edges of the first volume.

In some embodiments, the horizon model, fault model, and rock property model are accessed by a software platform such as SKUA® developed by Paradigm® (SKUA stands for Subsurface Knowledge Unified Approach and is a computing environment and software suite for modeling geological media). In some embodiments, the horizon model, fault model, and rock property model are generated by a module of the software platform and accessed (e.g., received) by a different module of the software platform.

Further to method 500, the computer system determines (506) one or more intersections (e.g., regions of intersection) between respective horizons of the horizon model and respective faults of the fault model by correlating the horizon model with the fault model (an example of two regions of intersection, each between a horizon and a respective fault, is shown FIG. 3C). In some embodiments, determining an intersection between a fault and a respective horizon includes determining, for each point on the respective horizon (e.g., as specified with respect to the first grid), whether the point falls within a predefined distance tolerance (e.g., 10 centimeters, 1 meter, 2 meters, or 5 meters) of the fault. Those points that are within the predefined distance tolerance of the fault are then considered (e.g., determined to be) within a region of intersection. In some embodiments, determining an intersection between a fault and a respective horizon includes determining an intersecting path (e.g., a one-dimensional path specified in a three-dimensional volume) and determining an offset magnitude and offset direction of the fault.

The computer system calculates (508) a faulted structural model for the geological medium in accordance with the one or more determined intersections between respective horizons of the horizon model and respective faults of the fault model (a simple example of a faulted structural model is shown in FIG. 3B). In some embodiments, the horizons in the plurality of horizons in the accessed fault model are (510) seamless horizons (e.g., represented by smooth, or simply-connected, surfaces). Calculating the structural model includes modifying a respective horizon of the plurality of horizons to include a seam, or a plurality of seams (e.g., by removing portions of the horizon), that corresponds to a respective intersection of a fault with the respective horizon. For example, in some embodiments, the regions of intersection that are determined in operation 504 are removed from the respective horizon. Alternatively, in some embodiments, portions of a respective horizon are removed in accordance with an intersection path and an offset magnitude and offset direction of the intersecting fault. Thus, a horizon that originally looks like the horizon shown in FIG. 3A is modified to look like the horizon shown in FIG. 3D.

In some embodiments, as noted above, a respective horizon of the horizon model is specified (512) with respect to the first grid. Calculating the structural model includes remapping the respective horizon onto a second grid distinct from the first grid, the second grid including a plurality of second spatial locations, one or more of said second spatial locations being aligned with a respective fault that intersects the respective horizon. In some embodiments, the first grid and second grid are finite difference grids and the second grid includes a plurality of grid locations (e.g., connected by grid lines) aligned along the respective fault (e.g., the second grid is constructed so as to capture the sharp changes in rock properties produced by the faults). In some embodiments, the first grid and the second grid are finite element grids and the second grid includes a plurality of finite element volumes having edges aligned with the respective fault. In this manner, the horizons in the horizon model and/or the faults in the fault model are remapped from the first grid to a second grid that is consistent with their intersection.

The computer system generates (514) an earth model for seismic forward modeling by assigning one or more physical rock properties to the faulted structural model in accordance with the rock property model. For example, in some embodiments, the computer system also remaps (516) the rock model onto the second grid. In some embodiments, the computer system warps the rock properties onto the second grid (or the first grid, if a second grid is not employed). This is realized, in some embodiments, by interpolating values of the rock properties specified with respect to the first grid to locations on the second grid (e.g., that are not on the first grid). Alternatively, the geological medium is modeled using a "layer cake" model in which rock properties are established as constant within respective lithographic strata. In this case, the remapping of rock model properties onto the second grid is realized by defining regions corresponding to respective lithographic strata (e.g., in accordance with the horizons and faults), and assigning rock properties based on the strata corresponding to each second grid location. In some embodiments, the earth model is (518) a three-dimensional model. To that end, in various embodiments, one, two, or all three of the horizon model, the fault model, and the rock property model, are specified in three-dimensions so that the generated earth model is also specified in three-dimensions.

In some embodiments, the computer system calculates (520), using the earth model, a velocity model for the geological medium. In some embodiments, the generated earth model (see operation 514) specifies a density at each location on the second grid. In some embodiments, the computer system generates a model that includes values for the Lamé parameters $\lambda$ and $\mu$ at each point on the computational grid. The computer system uses a mathematical relationship to calculate a velocity model. One such relationship is Gardner's relation, given below:

$$\rho = A v_p^B, \quad (1)$$

where $\rho$ is the density at a location in the geological medium, $V_p$ is the p-wave velocity at the location in the geological medium, A and B are constants with typical values of A=0.23 and B=0.25.

Alternatively, the p-wave velocity can be calculated from the Lame parameters $\lambda$ and $\mu$ using the relation:

$$v_p = \sqrt{\frac{\lambda + 2\mu}{\rho}}. \quad (2)$$

More generally speaking, in some embodiments, the computer system generates an earth model in operation 514 that describes one or more first rock properties at each location on a computational grid, and the computer system then calculates in operation 520 a model for a distinct set of one or more second rock properties for each location on the computational grid (i.e., meaning that at least one of the second rock properties is different than, or not among, the first rock properties).

In some embodiments, the computer system propagates (522) one or more seismic signals through the geological medium in accordance with the velocity model. In some embodiments, propagating the one or more seismic signals through the geological medium comprises (524) forward modeling of the one or more seismic signals. The operation of propagating (e.g., time-stepping, or forward modeling) the one or more seismic signals can be viewed as an operation of calculating, for each location on a computational grid (e.g., the first grid or the second grid), and at each of a plurality or sequence of times, at least one seismic wavefield resulting from the seismic signals. A seismic wavefield is a representation of the state of seismic waves in the geological medium (e.g., a wavefield represents displacement magnitudes and directions at each location on the computational grid). Two important aspects of wavefield propagation are an earth model, which has been described above, and a governing system of one or more propagation equations. In some embodiments, the governing system of one or more propagation equations used to propagate the one or more seismic signals comprises a system of equations that approximate the fully elastic wave equation. In addition, an attenuation (Q) model is used, in some embodiments, to simulate inelastic losses in the geological medium.

In some embodiments, synthetic (e.g., approximated) source signals (e.g., wavelets) are propagated through the geological medium to receiver locations in order to simulate received seismic data. The simulated received seismic data is then compared to measured seismic data (e.g., measured at the receiver locations) in order to iteratively refine the earth model. In some embodiments, the forward modeling comprises (526) reverse time migration (RTM) and is used to increase the resolution of seismic sections produced during geophysical exploration scenarios (see FIG. 1).

FIG. 6 is a block diagram illustrating a seismic modeling system 600, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic modeling system 600 includes one or more processing units (CPU's) 602, one or more network or other communications interfaces 608, memory 606, and one or more communication buses 604 for interconnecting these and various other components. The seismic modeling system 600 also optionally includes one or more seismic sensors 106 (e.g., geophones and/or hydrophones) and optionally includes one or more seismic sources 112 (e.g., air-guns). The communication buses 604 may include circuitry (sometimes called a chipset) that interconnects and controls communications between system components. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. Memory 606, including the non-volatile and volatile memory device(s) within memory 606, comprises a non-transitory computer readable storage medium.

In some embodiments, memory 606 or the non-transitory computer readable storage medium of memory 606 stores the following programs, modules and data structures, or a subset thereof including an operating system 616, a network communication module 618, and a seismic modeling module 620.

The operating system 616 includes procedures for handling various basic system services and for performing hardware dependent tasks.

The network communication module 618 facilitates communication with other devices (e.g., facilitates communication with the seismic sources 112 and/or the seismic sensors 106 if not included in the system 600, or facilitates communication with other land-based components) via the communication network interfaces 608 (wired or wireless) and one or more communication networks, such as the Internet, other wide area networks, local area networks, metropolitan area networks, and so on (e.g., in some embodiments, seismic modeling system 600 is located remotely from the seismic sources 112 and/or seismic sensors 106).

In some embodiments, the seismic modeling module 620 is configured to access (e.g., and store in data sub-module 626), for a geological medium: a horizon model 626-1 including a plurality of horizons in the geological medium; a fault model 626-2 including a plurality of faults in the geological medium; and a rock property model 626-3 including one or more physical rock properties at a plurality of spatial locations on a first grid corresponding to the geological medium. The seismic modeling module 620 includes a model registering sub-module 624 (which includes a set of instructions 624-1 and optionally metadata and parameters 624-2) that merges the three models. For example, model registering sub-module 624 correlates horizon model 626-1 with fault model 626-2 in order to determine one or more intersections between respective horizons of the horizon model and respective faults of the fault model. The model registering sub-module 624 then calculates a faulted structural model for the geological medium in accordance with the one or more determined intersections between respective horizons of the horizon model and respective faults of the fault model, and generates an earth model for seismic forward modeling by assigning one or more physical rock properties to the faulted structural model in accordance with rock property model 626-3.

In some embodiments, the seismic modeling module 620 propagates one or more seismic wavefields (e.g., propagates one or more seismic signals) using a propagation sub-module 622 (which includes a set of instructions 622-1 and optionally metadata and parameters 622-2). Propagation of seismic signals is described in greater detail with reference to method 500, FIG. 5.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of building an earth model comprising:
   accessing, for a geological medium:
      a horizon model including a plurality of horizons in the geological medium;
      a fault model including a plurality of faults in the geological medium; and
      a rock property model including one or more physical rock properties at a plurality of first spatial locations on a first grid corresponding to the geological medium;
   determining one or more intersections between respective horizons of the horizon model and respective faults of the fault model by correlating the horizon model with the fault model;
   calculating a faulted structural model for the geological medium in accordance with the one or more determined intersections between respective horizons of the horizon model and respective faults of the fault model; and
   generating an earth model for seismic forward modeling by assigning one or more physical rock properties to the faulted structural model in accordance with the rock property model.

2. The method of claim 1, wherein the horizons in the accessed horizon model are seamless horizons; and
   calculating the faulted structural model includes modifying a respective horizon of the plurality of horizons to include a seam that corresponds to a respective intersection of a fault with the respective horizon.

3. The method of claim 1, wherein a respective horizon of the horizon model is specified with respect to the first grid; and
   calculating the structural model includes remapping the respective horizon onto a second grid distinct from the first grid, the second grid including a plurality of second spatial locations, one or more of said second spatial locations being aligned with a respective fault that intersects the respective horizon.

4. The method of claim 3, further including remapping the rock model onto the second grid.

5. The method of claim 1, wherein the rock model includes:
   a low-frequency sub-model indicating a depth trend for the one or more physical rock properties that is determined in accordance with seismic data that is extrapolated onto the first grid; and
   a high-frequency sub-model indicating fluctuations in the one or more physical rock properties that are determined in accordance with well-log data that is extrapolated onto the first grid.

6. The method of claim 1, further comprising combining the earth model with a reservoir model.

7. The method of claim 1, further including:
   calculating, using the earth model, a velocity model for the geological medium; and
   propagating one or more seismic signals through the geological medium in accordance with the velocity model.

8. The method of claim 7, wherein propagating the one or more seismic signals through the geological medium comprises forward modeling of the one or more seismic signals.

9. The method of claim 8, wherein the forward modeling comprises reverse time migration (RTM).

10. The method of claim 1, wherein the earth model is three-dimensional (3D).

11. A computer system, comprising:
    one or more processors;
    memory; and
    one or more programs, wherein the one or more programs are stored in the memory and configured to be executed by the one or more processors, the one or more programs including instructions that when executed by the one or more processors cause the device to:
    access, for a geological medium:
       a horizon model including a plurality of horizons in the geological medium;
       a fault model including a plurality of faults in the geological medium; and
       a rock property model including one or more physical rock properties at a plurality of spatial locations on a first grid corresponding to the geological medium;
    determine one or more intersections between respective horizons of the horizon model and respective faults of the fault model by correlating the horizon model with the fault model;
    calculate a faulted structural model for the geological medium in accordance with the one or more determined intersections between respective horizons of the horizon model and respective faults of the fault model; and
    generate an earth model for seismic forward modeling by assigning one or more physical rock properties to the faulted structural model in accordance with the rock property model.

12. The computer system of claim 11, wherein the horizons in the accessed horizon model are seamless horizons; and calculating the faulted structural model includes modifying a respective horizon of the plurality of horizons to include a seam that corresponds to a respective intersection of a fault with the respective horizon.

13. The computer system of claim 11, wherein a respective horizon of the horizon model is specified with respect to the first grid; and calculating the structural model includes remapping the respective horizon onto a second grid distinct from the first grid, the second grid including a plurality of second spatial locations, one or more of said second spatial locations being aligned with a respective fault that intersects the respective horizon.

14. The computer system of claim 11, wherein the instructions further cause the one or more processors to remap the rock model onto the second grid.

15. The computer system of claim 11, wherein the rock model includes:

a low-frequency sub-model indicating a depth trend for the one or more physical rock properties that is determined in accordance with seismic data that is extrapolated onto the first grid; and a high-frequency sub-model indicating fluctuations in the one or more physical rock properties that are determined in accordance with well-log data that is extrapolated onto the first grid.

16. The computer system of claim 11, wherein the instructions further cause the one or more processors to combine the earth model with a reservoir model.

17. The computer system of claim 11, wherein the instructions further cause the one or more processors to:

calculate, using the earth model, a velocity model for the geological medium; and propagate one or more seismic signals through the geological medium in accordance with the velocity model.

18. The computer system of claim 17, wherein propagating the one or more seismic signals through the geological medium comprises forward modeling of the one or more seismic signals.

19. The computer system of claim 18, wherein the forward modeling comprises reverse time migration (RTM).

20. The computer system of claim 11, wherein the earth model is three-dimensional (3D).

21. A non-transitory computer readable storage medium storing one or more programs, the one or more programs comprising instructions, which when executed by an electronic device with one or more processors and memory, cause the device to:

access, for a geological medium:

a horizon model including a plurality of horizons in the geological medium;

a fault model including a plurality of faults in the geological medium; and a rock property model including one or more physical rock properties at a plurality of spatial locations on a first grid corresponding to the geological medium;

determine one or more intersections between respective horizons of the horizon model and respective faults of the fault model by correlating the horizon model with the fault model;

calculate a faulted structural model for the geological medium in accordance with the one or more determined intersections between respective horizons of the horizon model and respective faults of the fault model; and generate an earth model for seismic forward modeling by assigning one or more physical rock properties to the faulted structural model in accordance with the rock property model.

* * * * *